Patented Aug. 30, 1938

2,128,887

UNITED STATES PATENT OFFICE 2,128,887

PRODUCTION OF SATURATED MORPHOLINE ALKANOL-ALKYL ETHERS

Alexander L. Wilson, Pittsburgh, Pa., assignor, by mesne assignments, to Union Carbide and Carbon Corporation, a corporation of New York No Drawing. Original application December 4, 1934, Serial No. 755,912. Divided and this application May 5, 1937, Serial No. 140,837

5 Claims. (Cl. 260—247)

This invention relates to the production of morpholine ethanols and certain of their ethers. One modification of the invention concerns the production of the said compounds by a process that involves reacting a $\beta\beta'$ dihalogenated dialkyl ether with ammonia in aqueous or alcoholic solution, or with morpholine or a substituted morpholine in an alkaline medium. The resultant reaction products are heated and reacted with a fixed alkali such as caustic soda, preferably in excess. The reaction mixture must be maintained alkaline during the first step of the process either by the use of an excess of ammoniacal solution, an excess of morpholine with or without diluent or, as in the reaction of morpholine with dichlordiisopropyl ether, by caustic alkali. For the decomposition of the dimorpholinium chloride or intermediate product, a strong base such as sodium hydroxide is required.

When in the process, $\beta\beta'$ dichlordiisopropyl ether is reacted with morpholine, there is produced as a final product, dimethyl morpholine ethanol, which is a strongly basic water-soluble amine boiling at 230° C. under atmospheric pressure.

According to another modification of the invention, a vinyl ether of a morpholine ethanol, which may be produced in a manner described above in the process of producing morpholine ethanol, or in other suitable manner, is hydrolyzed and converted to a morpholine ethanol by acidifying the said ether in aqueous solution followed by a treatment of the resultant product with a strong base, such as sodium hydroxide. Thus it is possible to secure very high yields of morpholine ethanol from the dihalogenated dialkyl ether used as starting material.

The morpholine alkanol vinyl ethers produced in the first step of the process further may be converted to saturated morpholine alkyl ethers by the catalytic vapor phase hydrogenation thereof at temperatures somewhat above the boiling point of the morpholine alkanol alkyl ether being produced. The liquid condensate from the hydrogenation is then boiled with aqueous mineral acid or the equivalent to decompose any unreacted morpholine alkanol vinyl ether, following which an excess of sodium hydroxide is added and the amine layer which then separates is fractionally distilled. The type of reactions involved in the various steps of this invention is illustrated by the following equations, in which X stands for any halogen, $n$=either 2 or 4, and each R represents either hydrogen or the same or a different alkyl group:

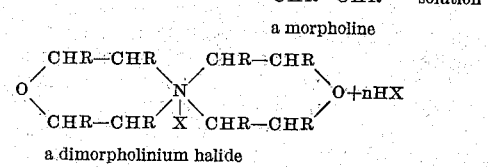

a morpholine a dimorpholinium halide a morpholine alkanol vinyl ether a morpholine alkanol vinyl ether a morpholine alkanol ethyl ether The following examples serve to illustrate the invention:

Example 1

A mixture of 83 pounds $\beta\beta'$ dichlordiethyl ether, 176 pounds of water and 98 pounds of ammonia was reacted to completion in an agitated closed vessel during a period of four to five hours at a temperature within the range from 65° to 80° C., and under a pressure ranging from 45 to 75 pounds per square inch gauge. The reaction product was cooled to around 40° C., and was then treated with a slight excess of sodium hydroxide. The ammonia, free low-boiling amines, and water were then distilled from the mixture, leaving behind a residue of sodium chloride containing the less volatile amines. These latter amines were extracted from the sodium chloride with benzene and were added to the distillate. Refractionation of this augmented distillate then yielded successive fractions containing ammonia, a constant boiling mixture of water and morpholine ethanol vinyl ether, morpholine, and morpholine ethanol. The morpholine ethanol vinyl ether fraction, boiling at 209° to 211° C., and the fraction containing morpholine ethanol and boiling within the range from 215° to 235° C., were separately recovered. In this example ammonia and dichlordiethyl ether were employed in the molar ratio of 10 : 1.

The molar ratio of ammonia to dihalogenated dialkyl ether may vary between rather wide limits, ranging from around 2 : 1 to a ratio of 20 or more to 1. In general, the yield of morpholine alkanol vinyl ether increases as the ammonia to dihalogenated dialkyl ether decreases, and the maximum obtainable yield of morpholine ethanol increases similarly.

Other $\beta\beta'$ dihalogenated dialkyl ethers may be substituted for that specifically named in the foregoing example. Moreover, it is possible to substitute morpholine for the ammonia in the first stage of the process, as indicated by the following example:

*Example 2*

A mixture containing ½ mol each of $\beta\beta'$ dichlordiisopropyl ether, morpholine, sodium hydroxide and water was charged into a flask under reflux and was reacted at the boiling point for fifteen hours with the addition of sufficient water to keep in solution the sodium chloride produced. The reaction product then was distilled, and unreacted ether and morpholine thus removed. The residue, containing salt and amine hydrochlorides, was evaporated to dryness and extracted with isopropanol, thus throwing out the sodium chloride. The extract, upon evaporation yielded dimethyl dimorpholinium chloride in the form of a stable white salt of high-melting point, soluble in water and in alcohols. This salt was heated to 150° C. with a strong hot aqueous solution of sodium hydroxide, yielding an oil layer insoluble in the sodium hydroxide but soluble in benzene. A benzene extract of this layer was distilled, and an amine fraction boiling at 220° to 225° C. under atmospheric pressure was separately recovered. This corresponds to dimethyl morpholine ethanol vinyl ether, and was a strong base, soluble in benzene and alcohols, and less than 1% soluble in water.

The intermediate product or morpholine alkanol vinyl ether formed in the first stages of the process, is readily convertible to the corresponding saturated morpholine ether, such as, for example, morpholine ethanol ethyl ether, by a vapor phase catalytic hydrogenation, as illustrated below.

*Example 3*

A reaction tube of a well known heat-resistant glass was filled with chips of a porous artificial filter stone essentially consisting of silica that had been impregnated with a mixture of nickel and thorium oxides which then were reduced with hydrogen. Through this catalyst chamber heated at 200° to 250° C. was passed a stream of hydrogen and morpholine ethanol vinyl ether vapor in the ratio of 4 to 5 mols of hydrogen per mol. of the ether. The resultant vapors were condensed at 20° C., yielding a liquid, which then was boiled with an excess of dilute aqueous hydrochloric acid, thereby decomposing unreacted morpholine ethanol vinyl ether. An excess of sodium hydroxide was then added whereupon the liquid stratified, forming an amine layer which was separated and was fractionally distilled. The fraction thereof distilling within the range of from 204° to 206° C. and containing morpholine ethanol ethyl ether, was separately recovered, and represented a yield of 61% based upon the original morpholine ethanol vinyl ether reacted.

It will be understood that although reference is made herein to distillations of the various reaction mixtures under atmospheric pressure, it is readily possible, and under some conditions desirable, to conduct these distillations under subatmospheric pressures, in order to secure the usual advantages of reduced distillation temperatures and protection against heat decomposition of the compounds present.

As shown in the various examples, the free amines may be obtained from solutions of their hydrochlorides by treatment with less volatile bases. In the case of sodium hydroxide, this may be added in the combining proportion, volatile amines distilled off, the higher-boiling amines extracted from the residue with alcohols, such as isopropanol, and the amines recovered. On the other hand, an excess of sodium hydroxide may be used, volatile amines distilled off, and the higher-boiling amines, or both the latter and the volatile amines present prior to the distillation, may be decanted or extracted from the caustic layer with a volatile solvent such as benzene.

Other means than those specifically described may be used for recovery of the desired amines. Thus, the reaction mixture from the ammonia-dichlorethyl ether reaction may be concentrated and unreacted materials removed, followed by a fractional crystallization of the amine hydrochlorides, and a treatment with caustic alkali of the appropriate crystalline fraction; or the said reaction mixture may be concentrated, and then heated with an excess of alkali, thus forming a layer of mixed amines. This amine mixture then may be fractionally distilled, and the various amines recovered.

Although the reaction between the dihalogenated ethers and ammonia may be conducted at pressures around atmospheric, it is preferable to use low superatmospheric pressures in order to effect the most efficient operation; and pressures up to 100 pounds per square inch gauge are particularly satisfactory.

The morpholine alkanol alkyl ethers prepared in accordance with the invention are excellent high-boiling solvents for gums; resins, such as vinyl resins; and cellulose derivatives. They also are useful as reaction solvents in Grignard syntheses and reactions involving the liberation of acid, in acetylations with acetyl chloride, and in dehydrohalogenations. They may be used in preparing volatile emulsifying agents and mercerizing penetrants, and in dyeing operations.

The term "a morpholine ethanol alkyl ether" and similar terms appearing in the specification and claims are intended to designate not only morpholine ethanol alkyl ether per se but also substituted morpholine ethanol alkyl ethers, such as dimethyl morpholine ethanol ethyl ether.

This application is a division of my copending application, Serial No. 755,912 for U. S. patent, filed December 4, 1934, entitled "Production of morpholine ethanols and certain ethers thereof."

It will be understood that the invention is not limited by the specific disclosure appearing in the examples, but that on the contrary it is susceptible of modification within the scope of the appended claims.

I claim:

1. The process of making a morpholine ethanol ethyl ether, which comprises hydrogenating a morpholine ethanol vinyl ether in the vapor phase in the presence of a hydrogenating catalyst.

2. The process of making a morpholine ethanol ethyl ether, which comprises hydrogenating a morpholine ethanol vinyl ether in the vapor phase in the presence of a hydrogenation catalyst, treating the resultant reaction mixture near the boiling temperature with aqueous acid solution, reacting this mixture with an excess of strong alkali, thereby effecting stratification of the mixture into a plurality of layers including an amine layer, separating the amine layer from the remainder of the mixture, fractionally distilling the said layer, and separately recovering the fraction containing the morpholine ethanol ethyl ether.

3. The process of making morpholine ethanol ethyl ether, which comprises hydrogenating morpholine ethanol vinyl ether in the vapor phase in the presence of a hydrogenation catalyst, treating the resultant reaction mixture near the boiling temperature with aqueous acid solution, reacting the mixture with an excess of strong alkali, thereby effecting stratification of the mixture into a plurality of layers including an amine layer, separating the amine layer from the remainder of the mixture, fractionally distilling the said layer, and recovering the fraction boiling around 204° to 206° C. under atmospheric pressure containing the morpholine ethanol ethyl ether.

4. The process of making a morpholine ethanol ethyl ether, which comprises hydrogenating a corresponding morpholine ethanol vinyl ether in the vapor phase, heating the reaction mixture with a dilute mineral acid, thereby decomposing unreacted morpholine ethanol vinyl ether, reacting the resultant mixture with an excess of a strong base, thereby stratifying the mixture into a plurality of layers including an amine layer, fractionally distilling the said amine layer, and separately recovering the fraction containing the morpholine ethanol ethyl ether.

5. The process of converting a $\beta\beta'$ dihalogenated dialkyl ether to a morpholine alkanol ethyl ether, which comprises reacting a $\beta\beta'$ dihalogenated dialkyl ether with an aqueous solution of a compound selected from the group consisting of ammonia and a morpholine, treating the resultant reaction mixture with an excess of a caustic alkali, thereby producing a morpholine alkanol vinyl ether, hydrogenating the latter in the vapor phase in the presence of a hydrogenation catalyst, heating the resultant reaction mixture with an aqueous solution of an inorganic acid, treating the acidified mixture with an excess of a strong alkali thereby stratifying the mixture into a plurality of layers including an amine layer, fractionally distilling the latter, and separately recovering therefrom the fraction containing the saturated morpholine alkanol ethyl ether.

ALEXANDER L. WILSON.